(12) United States Patent
Minemura et al.

(10) Patent No.: US 7,990,817 B2
(45) Date of Patent: Aug. 2, 2011

(54) OPTICAL DISK MEDIUM AND TRACKING METHOD

(75) Inventors: Hiroyuki Minemura, Kokubunji (JP); Toshimichi Shintani, Kodaira (JP); Yumiko Anzai, Ome (JP); Soichiro Eto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 633 days.

(21) Appl. No.: 11/882,915

(22) Filed: Aug. 7, 2007

(65) Prior Publication Data

US 2008/0285431 A1 Nov. 20, 2008

(30) Foreign Application Priority Data

May 17, 2007 (JP) .................................. 2007-131124

(51) Int. Cl.
*G11B 7/00* (2006.01)
(52) U.S. Cl. .................................. 369/44.28; 369/275.1
(58) Field of Classification Search ............... 369/44.27, 369/44.28, 44.29, 44.32, 47.27, 44.26, 275.3, 369/44.42, 44.43; 368/275.1, 275.2, 275.3, 368/44.27, 44.28, 44.29
See application file for complete search history.

(56) References Cited

U.S. PATENT DOCUMENTS

| | | | | |
|---|---|---|---|---|
| 7,072,251 B2 * | 7/2006 | Nakajima et al. | ......... | 369/44.26 |
| 7,426,173 B2 * | 9/2008 | Maegawa | ................... | 369/275.1 |
| 2005/0106508 A1 | 5/2005 | Shintani et al. | | |
| 2005/0276211 A1 | 12/2005 | Hirotsune et al. | | |
| 2006/0072434 A1 | 4/2006 | Shintani et al. | | |
| 2006/0262711 A1 | 11/2006 | Shintani et al. | | |
| 2006/0267211 A1 | 11/2006 | Shintani et al. | | |
| 2006/0275712 A1 | 12/2006 | Anzai | | |
| 2007/0009291 A1 | 1/2007 | Anzai | | |

FOREIGN PATENT DOCUMENTS

| | | |
|---|---|---|
| JP | 2005-100526 | 4/2005 |
| JP | 2006-107588 | 4/2006 |

OTHER PUBLICATIONS

U.S. Appl. No. 11/704,963, H. Minemura.
U.S. Appl. No. 11/705,021, H. Minemura.

* cited by examiner

*Primary Examiner* — Nabil Z Hindi
(74) *Attorney, Agent, or Firm* — Antonelli, Terry, Stout & Kraus, LLP.

(57) ABSTRACT

A super-resolution material is formed in only a data pit, in a low temperature state of the super-resolution material, reflectivity of each of a pit portion and a space portion and an optical phase difference therebetween are set to be sufficiently small, in a high temperature state, and at least the optical phase difference between the pit and the space is set to be larger than the aforementioned value in an absolute value. Accordingly, by conducting irradiation with an appropriate read power by which substantially only one data track width can be heated to a high temperature state, a good push-pull signal can be obtained even with a track pitch being less than a diffraction limit. At the same time, by an optical device having functions such as a switching means with a DPP type, an offset correcting means of the push-pull signal due to lens shift, a shaping means of the push-pull signal, a learning means of read power, and the like, there is provided an optical disk device that corresponds to the optical disk medium of the present invention and achieves an increase in capacity.

6 Claims, 22 Drawing Sheets
(2 of 22 Drawing Sheet(s) Filed in Color)

Space

Mark ( pit )

Tangential Direction

Adjustment of Reflectivity

Adjustment of Phase Difference

Temperature distribution at the center point of a track.

Temperature distribution at the midpoint of two tracks

Push-pull signals of groove tracks

Push-pull signals of the super-resolution tracks

OPTICAL DISK MEDIUM AND TRACKING METHOD

CLAIM OF PRIORITY

The present application claims priority from Japanese application JP 2007-131124 filed on May 17, 2007, the content of which is hereby incorporated by reference into this application.

BACKGROUND OF THE INVENTION

1. Field of the Invention

The present invention relates to an optical disk that forms a recording mark having a different physical characteristic from that of the other portion on a recording medium to store information and an optical disk device that reads information from the medium.

2. Description of the Related Art

The optical disk medium includes various types such as a CD-R/RW, DVD-RAM, DVD±R/RW, Blu-ray Disc (hereinafter referred to as BD), HD DVD, and the like, and such an optical disk medium that includes one with two data layers has come into general use. A so-called DVD super multi-drive, which is provided for writing/reading on/from CD-R/RW, DVD-RAM and DVD±R/RW, has widely available as the corresponding optical disk device. It is expected that high-performance drives, which are provided for BD and HD DVD, will be widely available in the future.

Today, a super-resolution technique, a solid immersion lens (SIL) and the like for next-generation large-capacity optical disks are proposed. A certain super-resolution technique is described, for example, in Japanese application JP 2006-107588. This describes that a phase-change recording film, which changes its optical characteristics when it melts, is embedded in pits to thereby perform super-resolution reading. Concurrently, recording marks are spatially separated from each other so as to reduce thermal interference between the recording marks and jitter in a super-resolution region. The aforementioned configuration makes it possible to improve linear density and track density at the same time, and as a result, storage capacity of the optical disk can be largely increased. Further, light transmittance in the region between data pits is increased to thereby allow an increase in an average light transmittance, so that high light utilization efficiency is achieved to produce an advantage for a multi-layering process. This type is hereinafter called as a three-dimensional pit selection type. As a means for embedding the recording film in the pit, it is possible to use a phase-change etching method (method using a difference in etching speed between liquid crystal and amorphous) and a physical polishing method such as a chemical mechanical polishing (CMP) as described in Japanese application JP 2005-100526.

SUMMARY OF THE INVENTION

A typical optical disk tracking control method includes a push-pull method using diffracted light in guide grooves and a differential phase detection (DPD) method using a phase difference between readout signals of a pit edge portion. The push-pull method is used in a recording type optical disk and there is widely and generally used a differential Push-Pull (DPP) method for suppressing offset caused by eccentricity of the optical disk medium. The DPD method is widely used as a tracking method of a ROM optical disk having a data pit string formed. The track pitch of the conventional optical disk is roughly about a half of a diameter of a beam spot. If the track pitch is reduced, amplitude of a track error signal decreases in the pull-push method and quality of the track error signal deteriorates due to an influence of crosstalk with an adjacent track and the like in the DPD method, and therefore stable tracking control cannot be achieved in either case. Moreover, in the DPD method, if the recording mark (pit) is reduced, a phase difference occurred at the edge portion decreases, and as a result, a stable track error signal cannot be obtained. In Japanese application JP 2006-107588, there is used an optical head with a 0.85 numerical aperture using a semiconductor laser as a light source with a wavelength of 405 nm to perform tracking control to a three-dimensional pit selection type disk with a track pitch of 0.24 µm in the same DPD method as used in the normal ROM. The optical head is specified to be compatible with BD, and therefore track narrowing is achieved where the track pitch is narrowed 1.5 times as compared with the normal track pitch of 0.32 µm; however, the above publication does not describe stability of tracking control. For the aforementioned reason, it is considered to be difficult to further narrow the track.

An object of the present invention is to provide a medium structure that solves the aforementioned problems and that is capable of narrowing tracks on a three-dimensional pit selection type disk, and to provide its corresponding optical disk device.

An optical disk medium of the present invention is one in which data is formed as a mark and a space on an information track according to a modulation code and a thin film material, having an optical constant varying between a high temperature state and a low temperature state, is formed in the mark. Moreover, an optical reflectivity and an optical phase of the mark are set to be substantially equal to those of the space in the low temperature state, while at least the optical phase in the optical reflectivity and the optical phase of the mark is set to be different from the optical phase of the space in the high temperature state. Consequently, power of an irradiating optical beam is appropriately selected, whereby a push-pull signal can be obtained even in a condition of a narrow track pitch that exceeds a diffraction limit.

A tracking method of the present invention is provided for the optical disk medium of the present invention, which decides power of an irradiating optical beam such that amplitude of a push-pull signal reaches maximum, and which executes tracking control by using the push-pull signal obtained at this time.

As mentioned above, it is possible to provide an optical disk medium that is capable of performing stable tracking control while increasing track density of a three-dimensional pit selection type disk. The corresponding optical disk device, which achieves tracking control using a push-pull track error signal, is basically used. However, in the case of executing DPP tracking by the conventional optical disk medium, its corresponding switching means is provided so as to make it possible to provide an optical disk device corresponding to either medium.

The optical disk medium and the optical disk device of the present invention make it possible to provide a large-capacity disk system by use of a super-resolution effect.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE PREFERRED EMBODIMENTS

Even if stable tracking is achieved by the present invention, there is no point in doing so if quality of readout data deteriorates due to crosstalk from an adjacent track caused by track narrowing of data track. In addition, there is a need to provide a specific configuration of a disk and a readout method thereof.

The following will specially describe problems and means for solving the problems in order to implement the optical disk medium and the tracking method of the present invention. The problems to implement the present invention include: (1) a reduction in crosstalk between data tracks caused by narrowing data track; (2) provision of specific disk configuration and disk manufacturing method; and (3) quantification of an effect of the present invention with respect to a push-pull signal obtained by the conventional method. The following will explain the means for solving the aforementioned problems.

(1) Reduction in crosstalk between data tracks caused by narrowing data tracks

In the three-dimensional pit selection type disk, a change in an optical characteristic caused on melting a phase-change recording film embedded in pits is used to perform super-resolution reading of a mark smaller than an optical resolution. On the other hand, the presence of a mark, which is larger than the optical resolution, makes it possible to obtain the same signal as in the case of the normal optical disk. The aforementioned operations are hereinafter referred to as super-resolution readout and normal resolution readout, respectively. In the case where the data track is narrowed, the track during readout is in a state of super-resolution readout since an optical energy is high, while an adjacent track is in a state of normal resolution readout since an optical energy is low. A normal resolution readout signal on an adjacent data track is leaked into a super resolution readout signal on the track during readout due to crosstalk, and therefore if the normal resolution readout signal is large, quality of the readout signal will deteriorate. In order to solve this problem, the normal resolution readout signal should be decreased as small as possible, preferably to zero. The technique, in which the normal resolution readout signal is decreased so as to reduce crosstalk in the super-resolution readout signal, is hereinafter referred to as normal resolution cancel technique.

Figure 2:
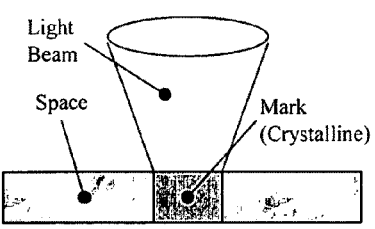
FIG. 2 is a conceptual view of normal resolution cancel.

FIG. 2 shows a concept of normal resolution cancel technique and two types of the technique will be given. It is herein assumed that reflectivity of a space portion is Rs, reflectivity of a mark in a crystalline state is Rc and reflectivity of a mark in a molten state is Rm. Configuration of type 1 is Rs=Rc. This allows amplitude (Rc−Rs) of the normal resolution readout signal to be zero, and allows amplitude (Rm−Rs) of the super-resolution readout signal to be ensured. Configuration of type 2 uses a physical difference in level between a pit and a space, and uses an optical phase difference depending on a film configuration of each of the pit and the space. At this time, by establishing Rs<Rc, and by equalizing an amount of light diffracted outside an aperture of an objective lens at the pit portion to an amount of light corresponding to a difference in reflectivity (Rc−Rs), amplitude (Rc−Rs) of the normal resolution readout signal can be made zero. At the super-resolution reading time, the reflectivity of the mark changes, whereby balance between both amounts of light is lost and this result is detected as signal amplitude. As shown in the figure, Rs=Rm is usually established to thereby allow an increase in amplitude of a high-super resolution readout signal. It should be noted that this feature is not essential for the present invention.

Figure 3:
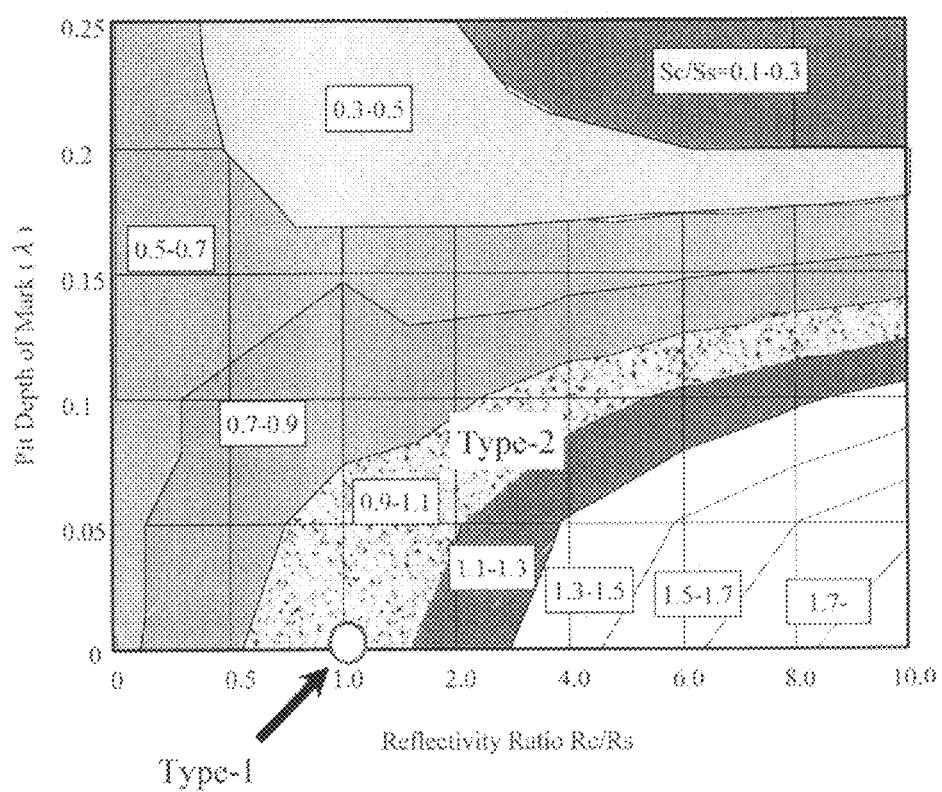
FIG. 3 is a view illustrating a relationship among amplitude of a normal resolution signal, reflectivity of a mark, and a depth of an effective pit.

FIG. 3 is a view illustrating a relationship among amplitude of a normal resolution signal, reflectivity of a mark, and an effective pit depth (mark optical phase difference/2). Here, this shows a result of calculation performed using a linear diffraction simulator based on Hopkins method when a wavelength of a light source is 405 nm, a numerical aperture of an objective lens is 0.85, a width of a mark is 0.16 μm and a length of the mark is 0.60 μm. In the figure, Sc and Ss indicate signal intensity, which is detected by an optical head, of the mark (crystalline state) and that of the space, respectively, and show a calculation result including a diffraction effect. A condition for normal distribution cancel is Sc=Ss. A condition for type 1 is one point where a reflectivity ratio Rc/Rs=1 and a depth of an effective pit=0λ, while in the case of type 2, a combination of the reflectivity ratio Rc/Rs and depth of an effective pit expands to a wide region as can be seen from the figure. This result shows that type 2 has a larger degree of freedom in the disk configuration to make its manufacturing easy.

Figure 4:
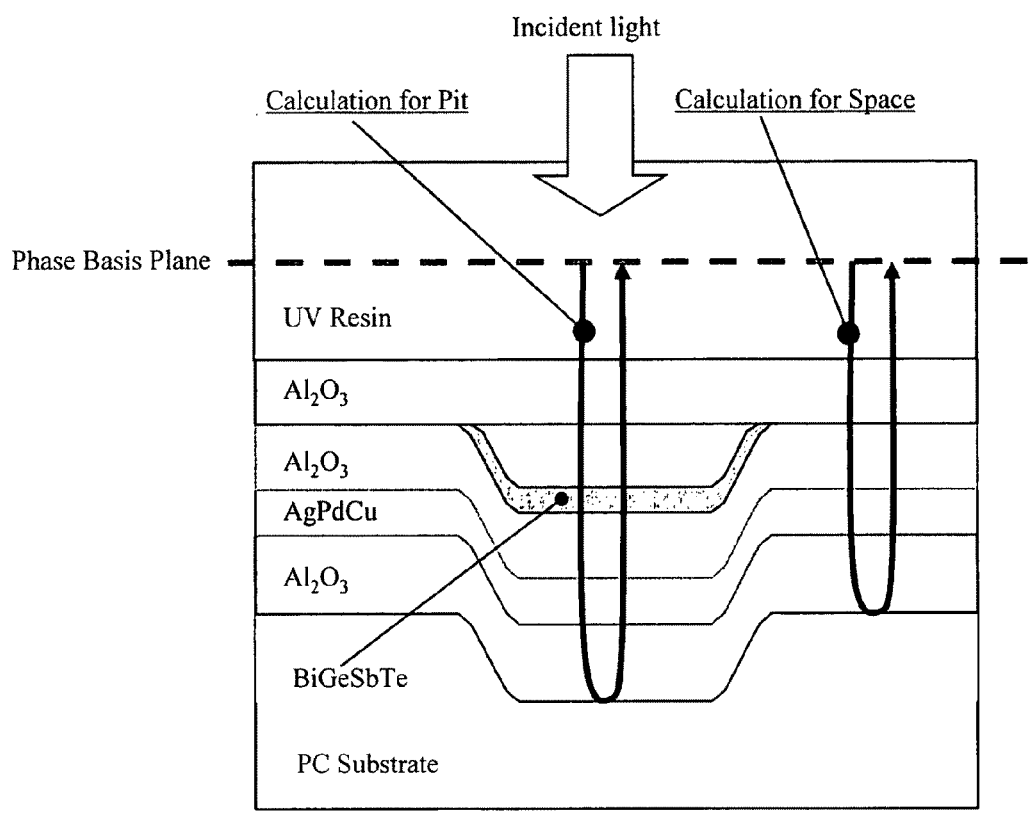
FIG. 4 is a model view of an optical calculation of an optical disk medium of the present invention.

In order to fix the disk structure, there is a need to calculate reflectivity and phase in each of the mark portion and space portion. As compared with the conventional method, some idea is required to calculate the reflectivity and phase of the mark portion of the three-dimensional pit selection type disk. FIG. 4 shows a model of an optical calculation of a three-dimensional pit selection type disk applied to CMP processing. Here, there is provided a normal multilayer interference calculation method using a characteristic matrix. A reference surface for phase calculation is virtually formed in a cover layer (UV resin according to BD optical system in the figure) on an incident light side first. Interference calculation using a character matrix is then performed according to a film configuration of each of the pit portion and space portion to obtain complex amplitude reflectivity. Thus, reflectivity of the pit portion, reflectivity of the space portion, and effective pit depth (optical phase) of the pit portion are calculated. This enables to calculate the reflectivity and the phase according to the physical depth of the pit formed on the substrate and the film configuration of each of the mark and space, and also enables to calculate a readout signal by inputting the result to the aforementioned linear diffraction simulator. The disk configuration in the figure is a basic configuration, which can be explained as follows. A PC substrate, which has a shortest pit length of 0.15 μm and a pit depth of 68 nm, is used as a substrate; an AgPdCu alloy thin film is used as a reflective film; a BiGeSbTe alloy thin film is used as a recording film; and an $Al_2O_3$ thin film is used as a protective film.

Figure 5:
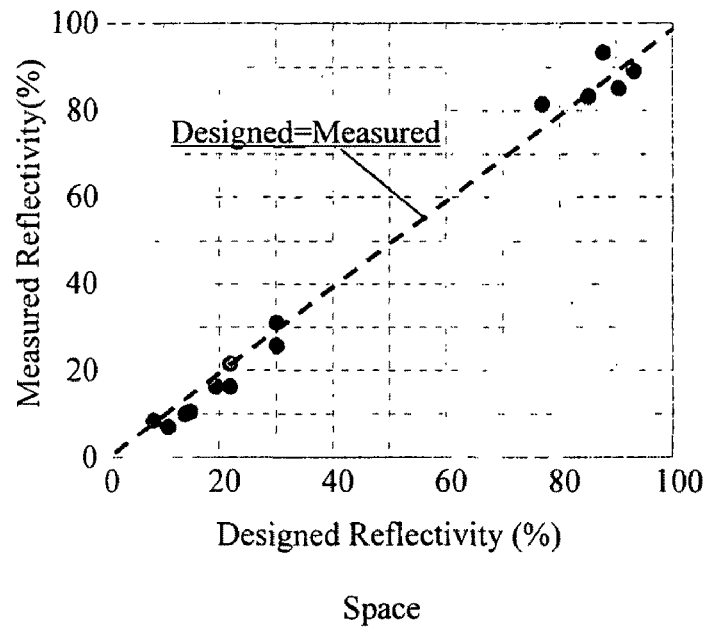
FIGS. 5A and 5B are graphs illustrating a designed result of reflectivity and a measured result thereof in connection with a space portion and a mark portion of a prototype disk.
Figure 5:
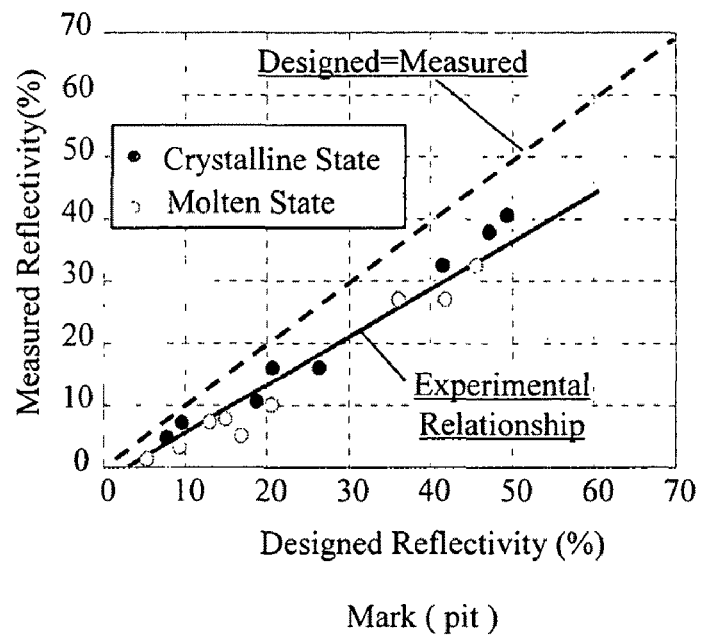

FIGS. 5A and 5B are graphs illustrating a designed result of reflectivity and a measured result thereof in connection with a space portion and a mark portion of a prototype disk. An optical head used in an experiment has a light source wavelength λ of 405 nm and an objective lens numerical aperture NA of 0.85, and $1/e^2$ diameter (λ/NA) of a light-condensing spot is about 476 nm. As a disk used in the experiment, there is prepared a plurality of disks each having an AgPdCu alloy thin film with a thickness ranging from 10 to 200 nm, a BiGeSbTe alloy thin film with a thickness ranging from 10 to 30 nm, and an $Al_2O_3$ thin film with a thickness ranging from 10 to 90 nm. Regarding the reflectivity of the space portion, a designed value and a measured value match well each other. Regarding the reflectivity of a pit portion, the measured value is smaller than the designed value, but this is considered because the size of the pit is smaller than the wavelength, and as a result, a difference is caused between the aforementioned calculation method and the method of a multiplex interference calculation model where a flat multilayer that expands endlessly is modeled. It is confirmed that design of the film configuration could be sufficiently implemented with the aforementioned calculation method, and also that amplitude of the normal resolution signal could be made close to zero with the addition of correction according to an experiment of the present invention. This result reveals that about ten percent amplitude of the super-resolution signal could be obtained with respect to the reflectivity of the space portion.

The following will explain a result of calculation of an electromagnetic field with a finite differential time domain (FDTP) method. Herein, explanation is centered on a result of a normal resolution cancel structure of type 1 for simplicity of calculation, but in a normal resolution cancel structure of type 2, the calculation method is basically the same as used in type 1.

Figure 6:
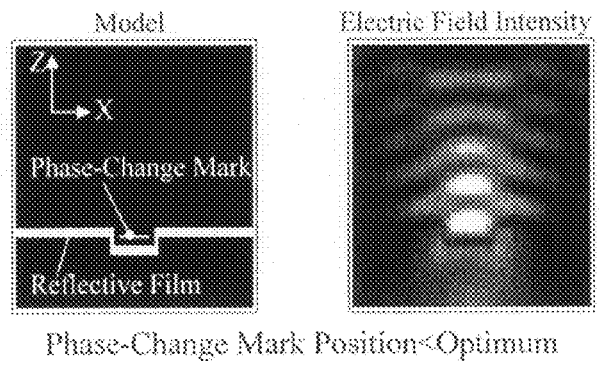
FIGS. 6A to 6C are views illustrating a calculation result of an electromagnetic field by an FDTP method.
Figure 6:
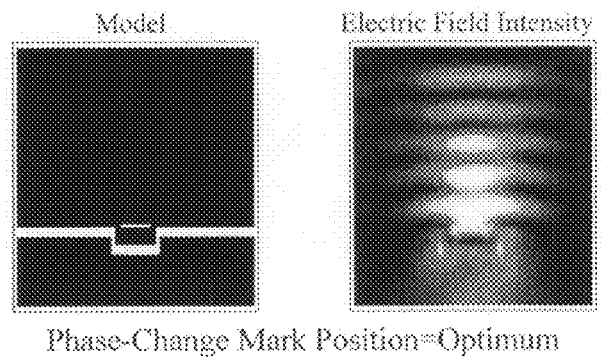
Figure 6:
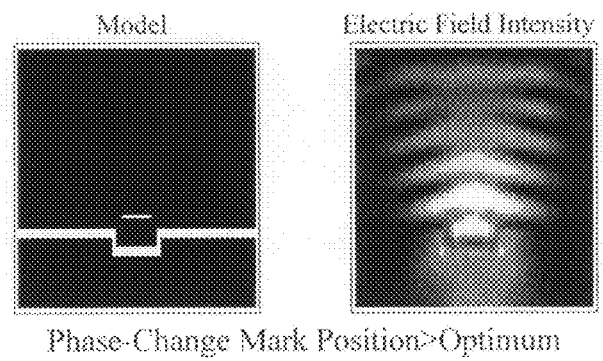

FIGS. 6A to 6C are views illustrating an example of a result obtained by carrying out calculation of an electromagnetic field by FDTP. Herein, a phase-change recording film is formed in a pit coated with a reflective film to show a state in which the distribution of electric field intensity changes depending on a position of its film thickness direction (Z direction in the figure). FIG. 6B is a condition appropriate for the configuration of type 1 where diffraction by the mark reaches a minimum and reflectivity of the mark and that of the space are equal to each other. At this time, a reflective film of the space portion and a recording film in the pit are placed at roughly the same position in a film thickness direction. This is the main point of the normal resolution cancel structure of type 1.

Figure 7:
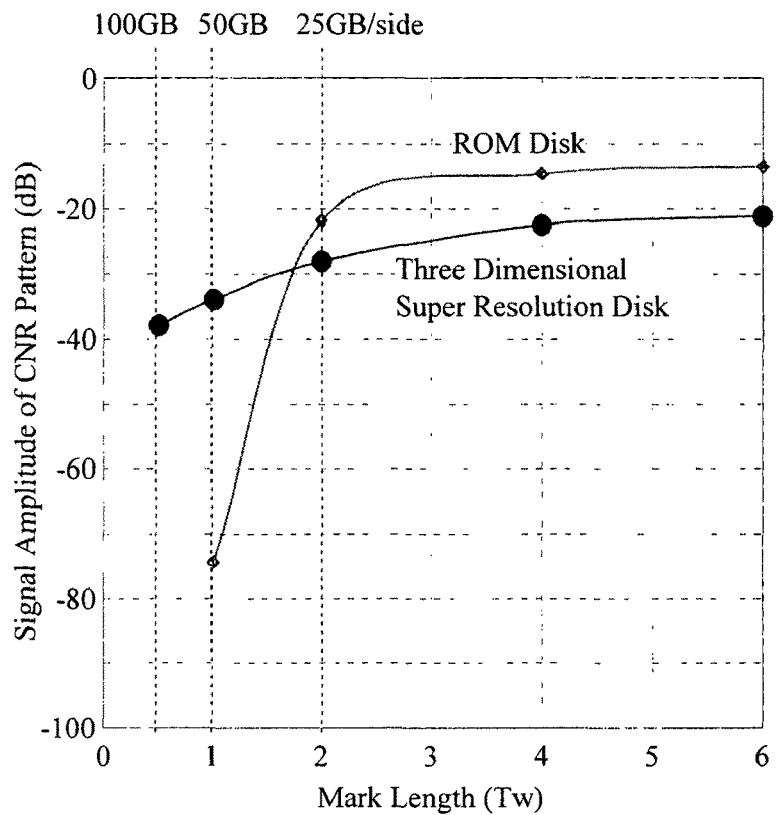
FIG. 7 is a graph illustrating a calculation result of a relationship between a mark length of a repetitive signal and signal amplitude thereof obtained by the FDTD method.

FIG. 7 is a graph illustrating a result obtained by calculating a relationship between a mark length of a repetitive signal and signal amplitude thereof by FDTD. Herein, a result of model in FIG. 6B is shown. As shown in the figure, it is revealed that a three-dimensional pit selection disk with a normal resolution cancel structure can obtain sufficient signal amplitude even under a condition of 100 GB where linear density of BD was increased fourfold as compared with a normal ROM disk.

(2) Provision of specific disk configuration and disk manufacturing method

A configuration of a specific disk will be described on assumption of CMP processing. If the disk undergoes CMP processing, it is possible to process a disk surface flat. Using the normal resolution cancel structure as mentioned above makes it possible to obtain a good push-pull signal on which an influence of crosstalk to the readout signal is small even if the track is narrowed.

Figure 8:
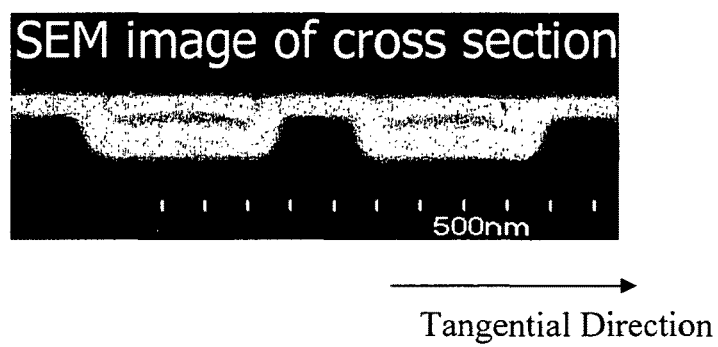
FIG. 8 shows an SEM photograph of a cross-section of an optical disk of the present invention.

FIG. 8 shows a scanning electron microscopy (SEM) photograph of a cross-section of an optical disk of the present invention. This is one that is obtained by embodying the configuration schematically shown in FIG. 4.

Figure 9:
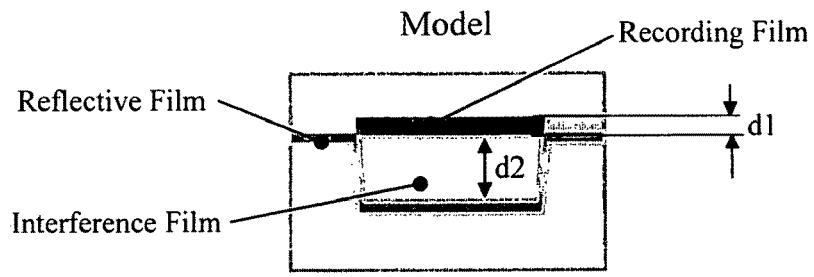
FIGS. 9A to 9C are views illustrating an adjustment method for reflectivity and a phase of an optical disk medium of the present invention and its result.
Figure 9:
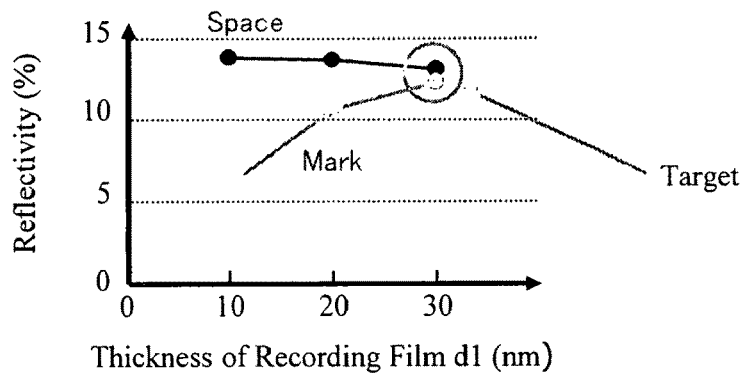
Figure 9:
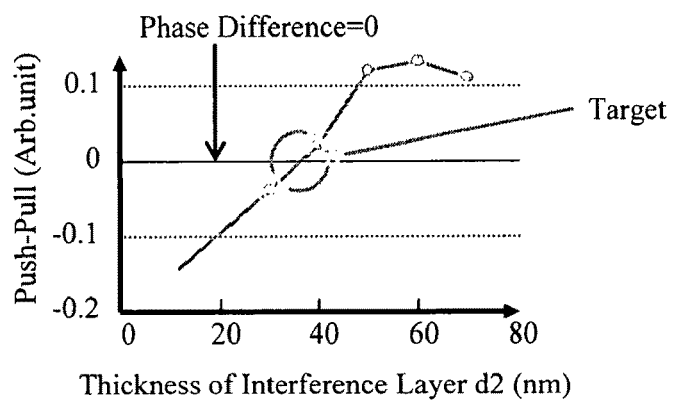

In connection with the aforementioned configuration, a specific adjustment method for the reflectivity and phase of the mark will be described. FIGS. 9A to 9C are views illustrating an adjustment method for the reflectivity and phase in connection with the mark and the space and its result. As illustrated in FIG. 9A, the basic configuration of the mark is formed by laminating a reflection film/a protective film (interference film)/recording film. The reflectivity of the space is selectable by choosing a material of the reflection film and a film thickness. The reflectivity of the mark can be adjusted by mainly a thickness d1 of the recording film as shown in FIG. 9B. Moreover, the phase of the mark portion can be adjusted by mainly a thickness d2 of the protective film (interference film). In the case where a good result is not obtained even if such adjustment is made, the configuration of the reflection film is reviewed and the same process is repeated to thereby finally obtain a satisfactory disk configuration.

Figure 10:
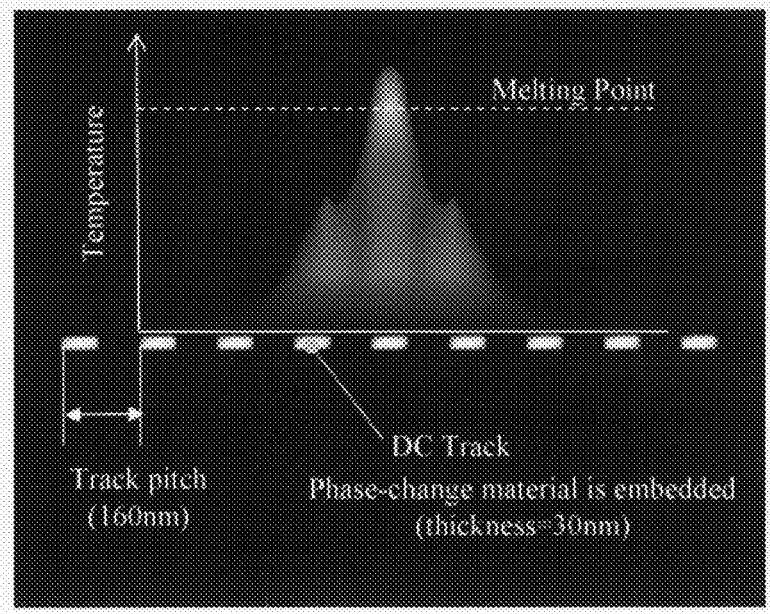
FIGS. 10A and 10B are views illustrating a result of a thermal simulation of an optical disk medium of the present invention.
Figure 10:
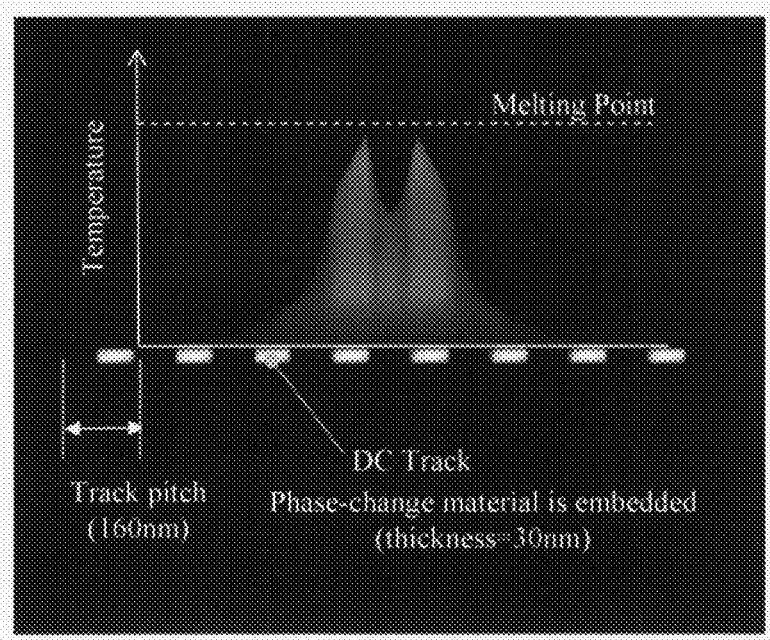

(3) Quantification of effect of the present invention with respect to a push-pull signal obtained by the conventional method The effect of the present invention is quantified using a thermal simulation and an optical simulation. FIGS. 10A and 10B show a result of the thermal simulation that is performed with the aforementioned FDTD method. Here, a configuration is used in which a BiGeSbTe alloy thin film (thickness of 30 nm and width of 80 nm) as a recording film is embedded in a data track with a track pitch of 160 nm. The following conditions are applied for the thermal simulation. A wavelength of a light source is 405 nm; a numerical aperture of an objective lens is 0.85; a scanning rate of an optical beam is 5 m/s; a mark length and a space length are 600 nm, respectively; the mark and the space are alternately formed on the data track; and the marks are arrayed in a radial direction (direction orthogonal to the track). FIG. 10A shows a calculation result when an optical beam scans the center of the data track. Since only the recording film formed in the mark is used as an optical energy absorber, this is reflected in a temperature distribution. FIG. 10B shows a calculation result when an optical beam scans an intermediate area between the data tracks. It is revealed that the two data tracks, which are most adjacent to the optical beam, are heated to a high temperature. As explained above, power of the optical beam is appropriately determined to thereby fix a condition in which the temperature of the recording film becomes a melting point or more when the optical beam is at the center of the data track, while the temperature of the recording film becomes below the melting point when the optical beam is at an intermediate area between the data tracks.

FIGS. 11A and 11B show a result in which push-pull signals are computed using a diffraction calculation. FIG. 11A shows push-pull signals obtained from track grooves of the conventional optical disk using no super-resolution. It is assumed that amplitude of the push-pull signal is normalized such that amplitude obtained under a condition of a track pitch of 320 nm is ±1. It is also assumed that the track groove is formed to have a U-shape groove having a duty ratio of 50% with respect to the track pitch and a groove depth of λ/8. As shown in the graph, the amplitude of the push-pull signal decreases along with a reduction in track pitch, and when the track pitch is 240 nm or less, the amplitude becomes almost zero due to diffraction limit. FIG. 11B shows push-pull signals obtained from the optical disk medium of the present invention. Here, it is assumed that an optical constant varies by ±0.4 from the center of a beam spot due to melting of a track pitch width area. A phase depth of molten mark is assumed to be λ/40 from a design result using a BiGeSbTe alloy thin film of 30 nm in thickness. As can be seen from the graph, it is shown that only one data track is melted by the optical beam, so that even under a condition of a track pitch of 200 nm, it is possible to obtain a push-pull signal having the same amplitude as that of the push-pull signal obtained under the condition of the track pitch of 320 nm of the conventional optical disk.

As mentioned above, it is verified from the simulation that the narrowed track (200 nm/320 nm), which is about two-thirds of that of the conventional optical disk medium, can be achieved by the optical disk medium of the present invention.

The following will explain the details on the present invention using an embodiment.

Figure 1:
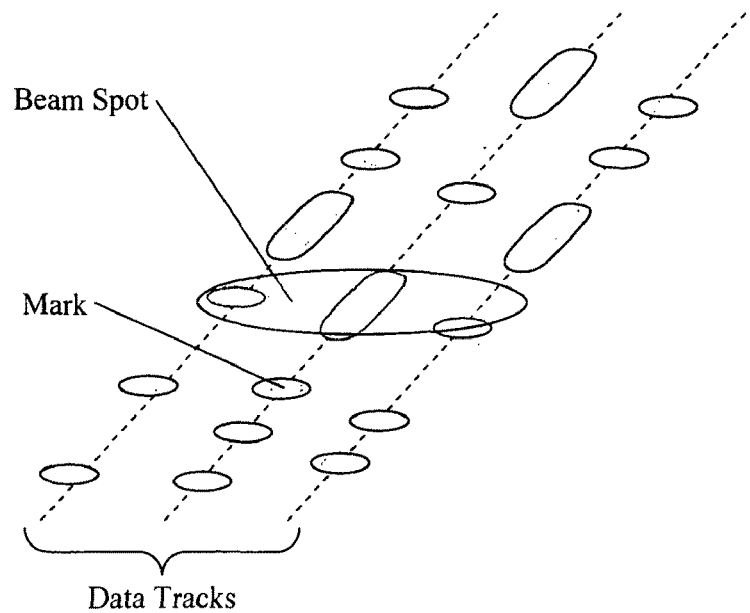
FIGS. 1A and 1B are views illustrating a track configuration example of an optical disk medium of the present invention.
Figure 1:
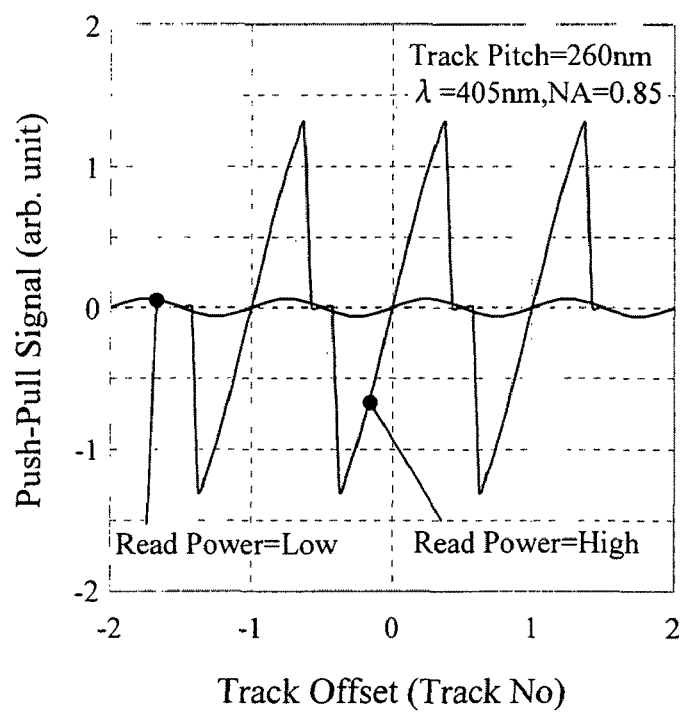

FIGS. 1A and 1B are views illustrating a track configuration of the optical disk medium of the present invention. Track narrowing can be achieved by a medium configuration in which a material, having an optical constant varying at a high temperature time, is embedded in only a mark, and in which normal resolution cancel is implemented at a low temperature time. FIG. 1A is a schematic view illustrating information tracks of an optical disk medium appropriate for the present invention. As mentioned above, the material, having an optical constant varying at the high temperature time, is embedded in only the mark. FIG. 1B shows a push-pull signal to be detected. As mentioned above, when power of an irradiating laser beam is low (in the figure, Read Power=Low), a push-pull signal can be obtained based on the normal diffraction phenomenon. On the other hand, when power of the irradiating laser beam is appropriately high (in the figure, Read Power=High in the figure), it is possible to obtain a good high push-pull signal, where an optical constant varies at only a mark just below a laser spot, based on a super-resolution effect. The above is an abstract of the calculation result shown in FIG. 11.

Figure 12:
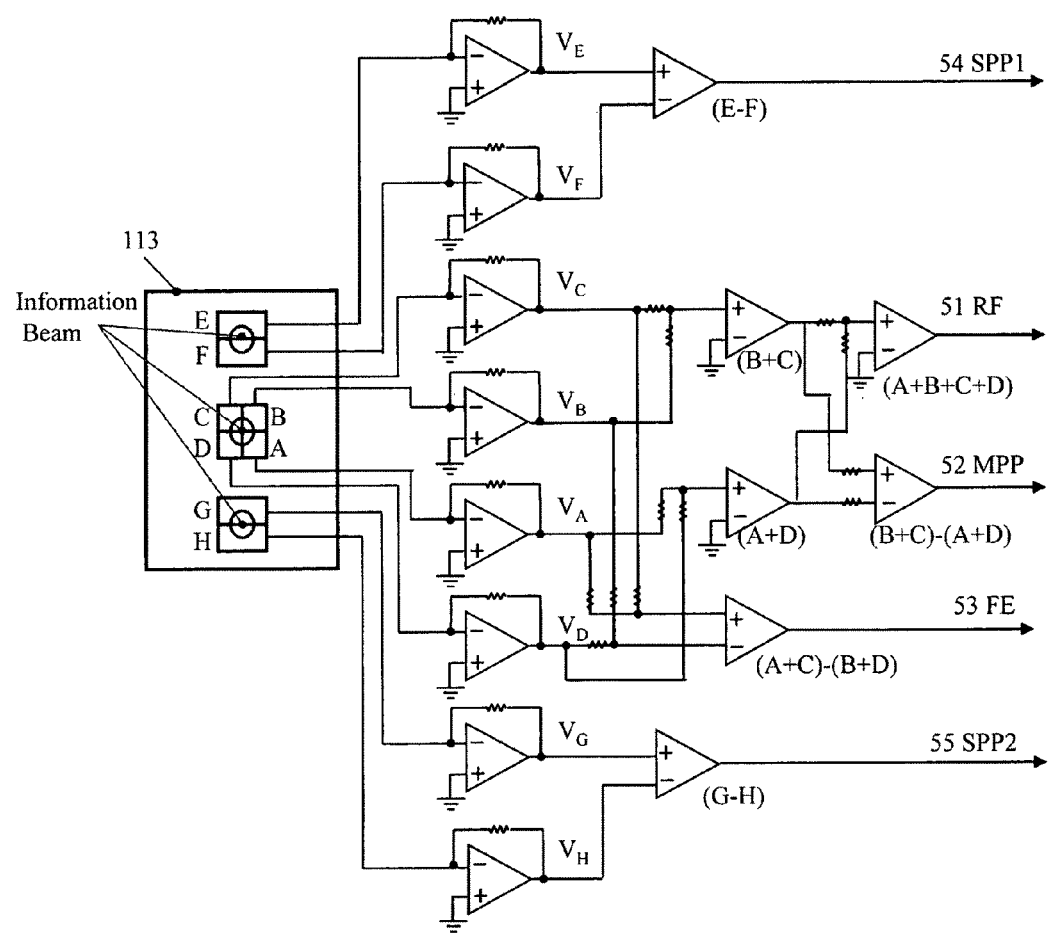
FIG. 12 is a view illustrating a photodetector with a three-beam optical head that allows a DPP type tracking and its detection signal.

An explanation will be next given of an embodiment of an optical disk device of the present invention. FIG. 12 is a view illustrating a photodetector with a three-beam light head that allows DPP type tracking, which is generally used, and its detection signal. A photodetector 113 is composed of a four-division detector (A, B, C, D) for a main beam and two two-division detectors (E, F; G, H) for a sub-beam, and each beam is converted into a voltage signal via an I-V conversion amplifier, and then an RF signal 51 for data readout, a main beam push-pull signal 52, an anastigmatic focus error signal 53, and sub-beam push-pull signals 54 and 55 are generated. In the general optical disk device, in many cases, two-division detectors for a sub-beam are electrically connected to each other directly as in (E+G) and (F+H) respectively to generate a push-pull signal for a sum of sub-beams in order to reduce a circuit scale. However, the optical disk device of the present invention is required to extract each push-pull signal as an independent electric signal in order to read a wobble signal. In the optical system provided for BD, a semiconductor laser with a wavelength of 405 nm may be used as a light source and a numerical aperture of an objective lens (not shown) maybe 0.85.

A brief explanation will be given of a method for generating three beams from one semiconductor laser beam source to form a beam spot. The following will describe a method using a diffraction grating. A laser beam emitted from a semiconductor laser is divided into three beams at angles of 0 and ±1 orders of diffraction when transmitted through the diffraction grating with pitches formed at equal distances. By using an optical system such that 0-order diffraction light is made for a main spot and +1-order diffraction light and −1-order diffraction light are made for sub-spots respectively, three beam spots can be easily formed on the disk. This is the method that is widely and generally used in the optical disk device.

Figure 13:
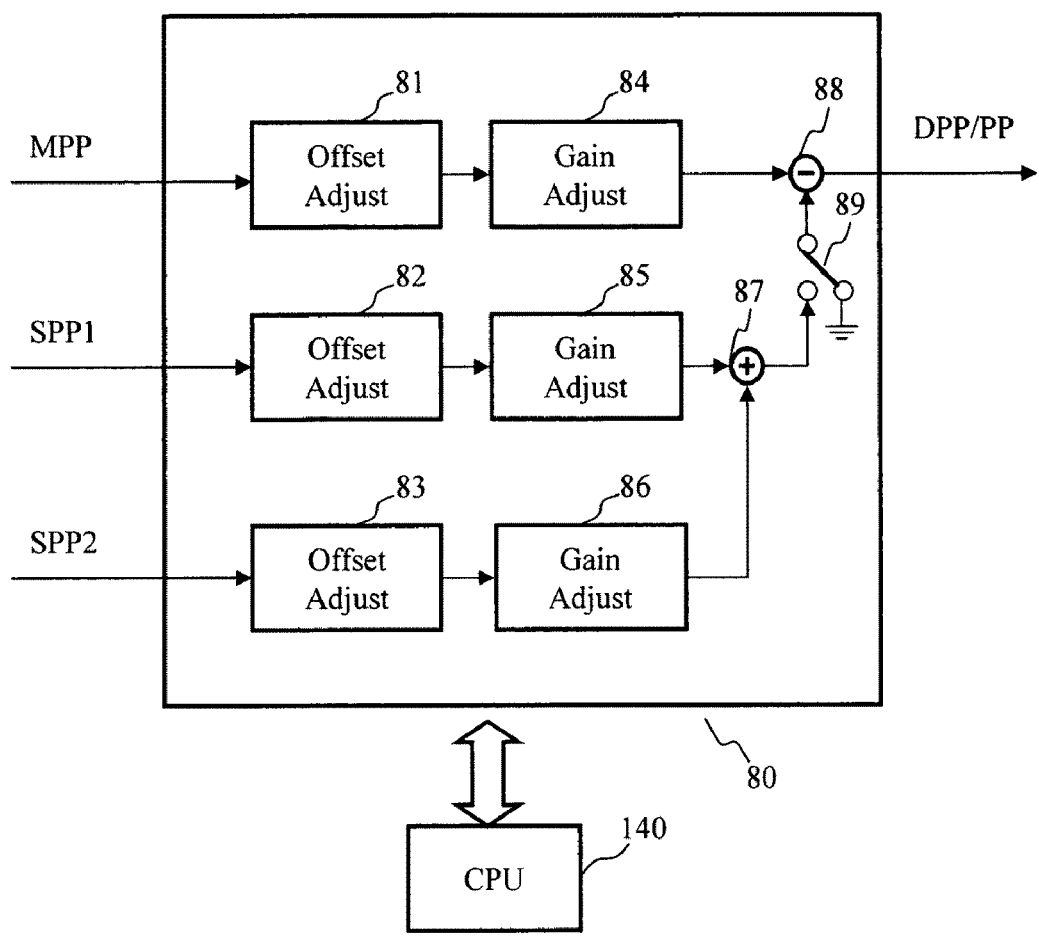
FIG. 13 is a view illustrating a configuration example of a track error signal generation circuit that generates a DPP signal.

FIG. 13 is a view illustrating a configuration example of a track error signal generation circuit. A track error signal generation circuit 80 is composed of offset adjustment circuits 81 to 83, gain adjustment circuits 84 to 86, an adder 87 for a sub-beam push-pull signal, a subtracter 88 that generates a DPP signal, and a switch 89 that selectively switches the DPP signal and the push-pull signal. In the conventional optical disk device using no super-resolution, tracking is controlled using the DPP signal, and therefore, in the present circuits, a push-pull signal MPP for a main beam and push-pull signals SPP1 and SPP2 for two sub-beams are used to perform offset adjustment and gain adjustment, and then a DPP signal as (MPP-SPP) is calculated. At this time, offset adjustment and gain adjustment are controlled by an instruction from a CPU 140. A generated DPP signal or push-pull signal is used for tracking control. In the case of reading the optical disk medium of the present invention, power of the sub-beams is as low as about 1/10 of that of the main beam, so that the mark cannot be melted by the sub-beams, and therefore there is a need to execute tracking control using the push-pull signal for the main beam. This is controlled by turning ON/OFF the switch 89 according to an instruction from the CPU 140.

Figure 14:
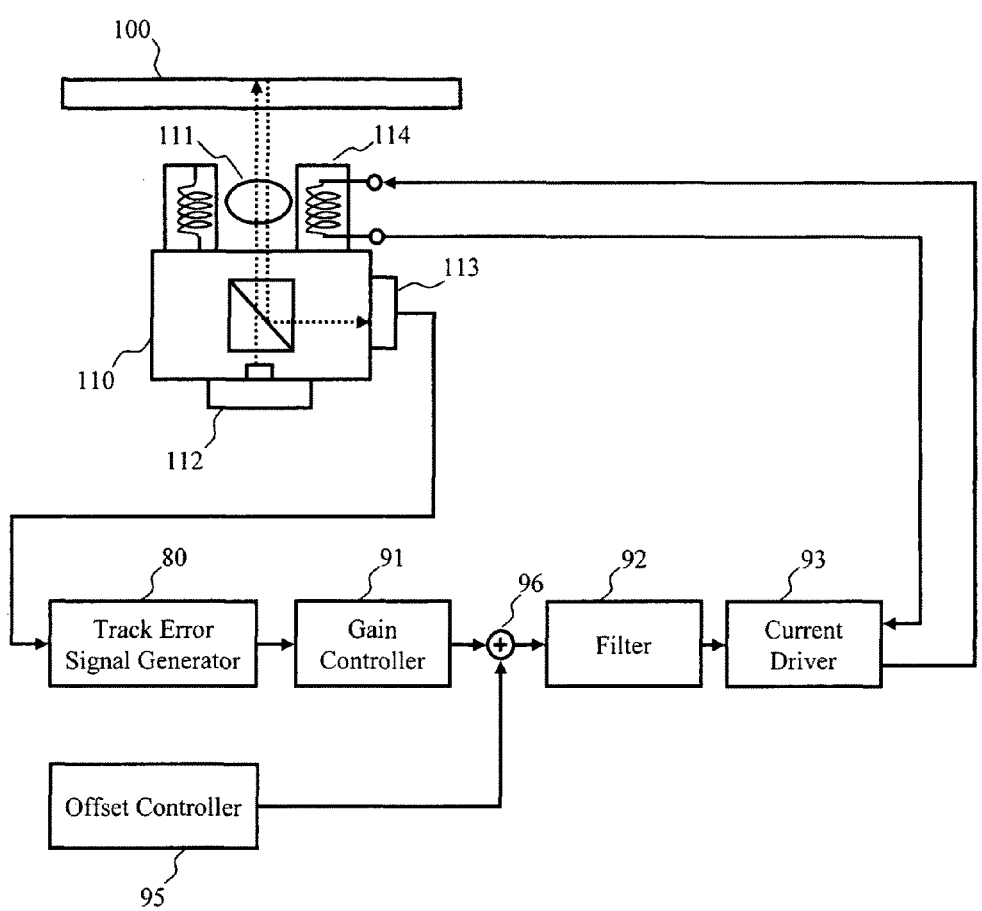
FIG. 14 is a view illustrating a configuration example of a tracking control circuit of an optical disk device of the present invention.

FIG. 14 is a block diagram illustrating a configuration example of a tracking control circuit of the optical disk device of the present invention. In the figure, a reflected light detected by the photodetector 113 is converted into an electrical signal, and thereafter sent to the track error signal generation circuit 80 to generate a DPP signal. The DPP signal is passed through a servo gain control circuit 91, a phase filter 92, and a current driver 93 to control an objective lens actuator 114, thereby achieving tracking control. In the present invention, tracking control is executed using the push-pull signal for the main beam. In a tracking system that uses a push-pull signal for one beam, it has been known that an objective lens is moved following the eccentricity of the disk to thereby generate an offset in a track error signal. In order to deal with this, the offset control circuit 95 has a function of correcting an offset of the track error signal generated by the eccentricity of the disk. The offset of the signal is added to a tracking control loop via the adder 95, thereby achieving readout of a predetermined data track. A specific configuration of the offset control circuit 95 is described next.

Figure 15:
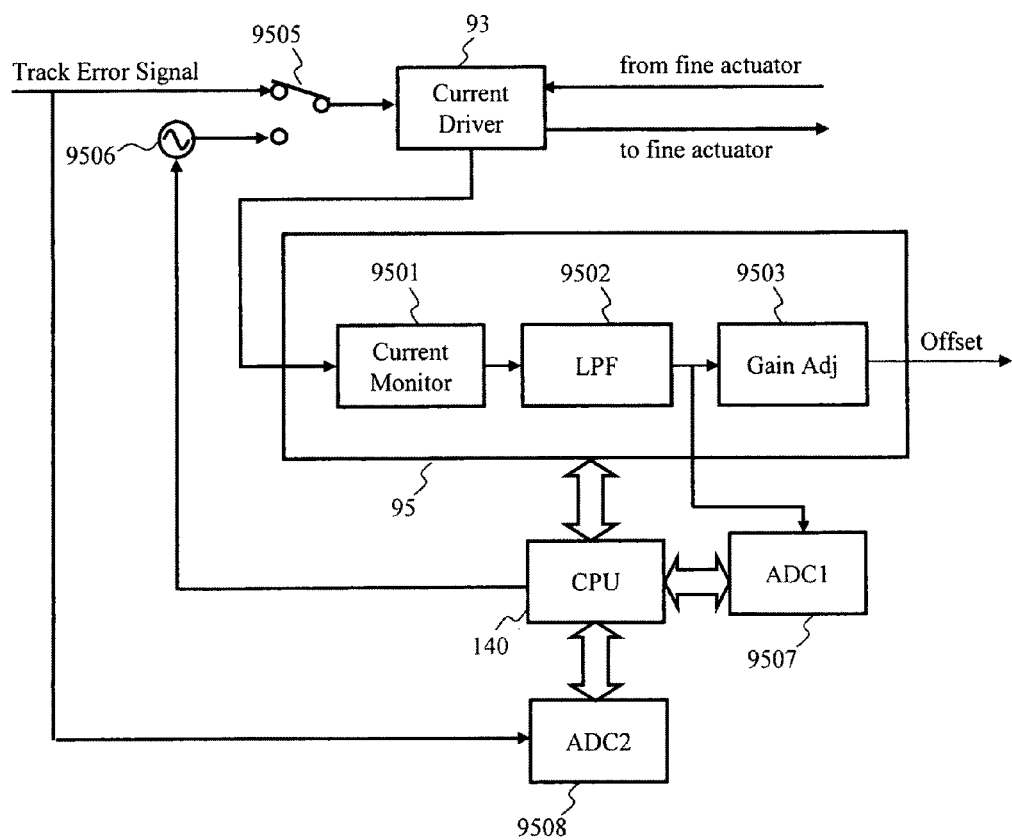
FIG. 15 is a view illustrating a configuration example of an offset control circuit appropriate for the present invention.

FIG. 15 is an embodiment illustrating a configuration of an offset control circuit appropriate for the present invention. In the figure, the offset control circuit 95 is composed of a current monitor 9501, a low-pass filter 9502, and a gain adjuster 9503. An amount of currents to be supplied to the objective lens actuator from the current driver 93 is detected as, for example, a current signal by the current monitor 9501. This signal is passed through the low-pass filter 9502 having a cutoff frequency, which is about a few times to ten times as high as a disk rotation frequency, to thereby detect a drive current smoothed following the eccentricity of the disk. The drive current thus obtained is multiplied by a designed value of current sensitivity of the object lens actuator, thereby making it possible to detect an amount of movement of the objective lens actuator following the eccentricity of the disk. On the other hand, a relationship between the amount of movement of the objective lens actuator and an amount of offsets of the push-pull signal can be obtained by an optical design in advance. Accordingly, in order to cancel the amount of offsets of the push-pull signal caused by the movement of the objective lens actuator in a radial direction from the detected current, the gain adjuster 9503 multiplies the drive current by an appropriate gain to thereby make it possible to output an amount of corrected offsets.

Here, an example is shown where designed values are used as current sensitivity of the object lens actuator and an amount of offsets of the push-pull signal, respectively. However, these values vary for each part to be used. For this reason, in the drive device, it is desirable to measure the amount of currents actually flowed to the objective lens actuator and the amount of offsets occurred in the push-pull signal, so as to correct the measured values. In this case, first of all, with only autofocus control being controlled, a switch 9505 is switched to connect an output of a sinusoidal oscillator 9506 to the current driver 93, so that a drive current waveform is obtained by an AD converter 9507. At the same time, a push-pull signal waveform is obtained by an AD converter 9508. These obtained values are processed by the CPU 140 to thereby achieve a desired correction.

Figure 16:
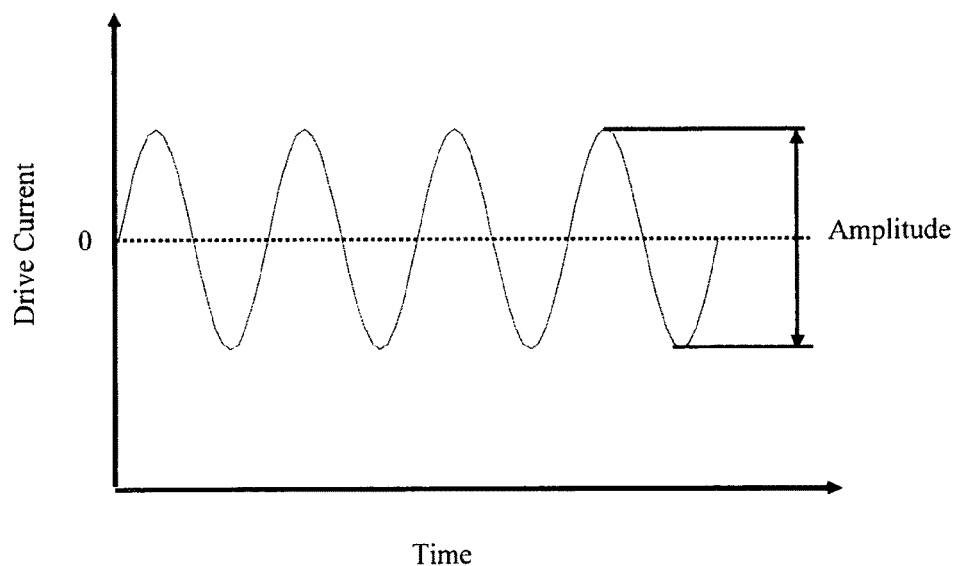
FIGS. 16A and 16B are schematic views illustrating a drive current of an objective lens actuator and a push-pull signal.
Figure 16:
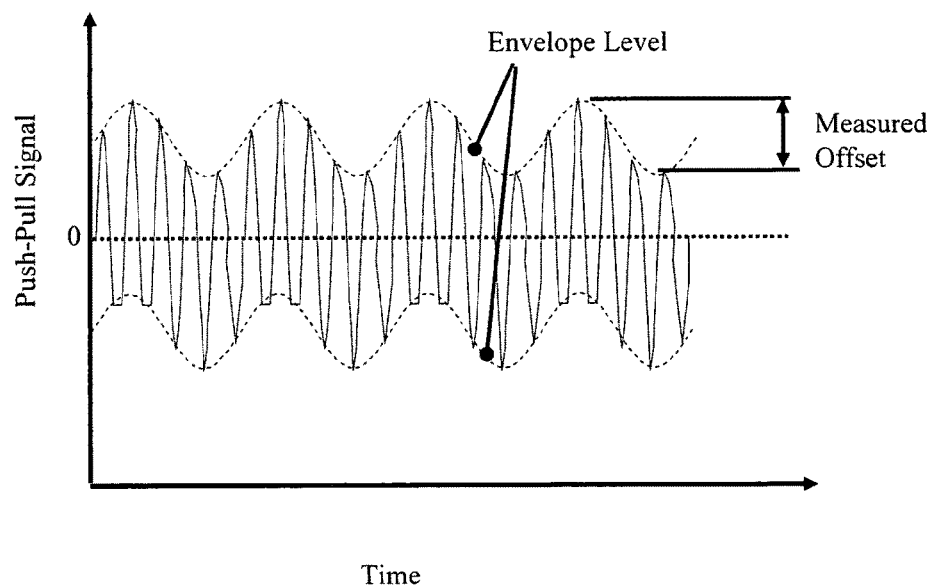

The signals obtained at this time are schematically shown in FIGS. 16A and 16B. FIG. 16A is a schematic view of the drive current to obtain amplitude of the drive current therefrom. FIG. 16B is a schematic view of the push-pull signal to obtain an amount of offsets therefrom. In terms of the point that the push-pull signal as shown in FIG. 16B can be obtained by the movement of the objective lens actuator and the point that variation in envelope or variation in average value indicates the amount of offsets, these points are the common knowledge to those skilled in art, and therefore detailed explanation is not given here. Thus, it is possible to obtain the relationship between the amount of drive currents and the amount of offsets of the push-pull signal which are observed by repeating a series of measurements while changing the output of the sinusoidal oscillator 9506. Using this relationship makes it possible to easy set an amount of offsets to be corrected during tracking control, namely, an amount of gains (negative value in the case of FIGS. 16A and 16B) that is set by the gain adjuster 9503.

Figure 17:
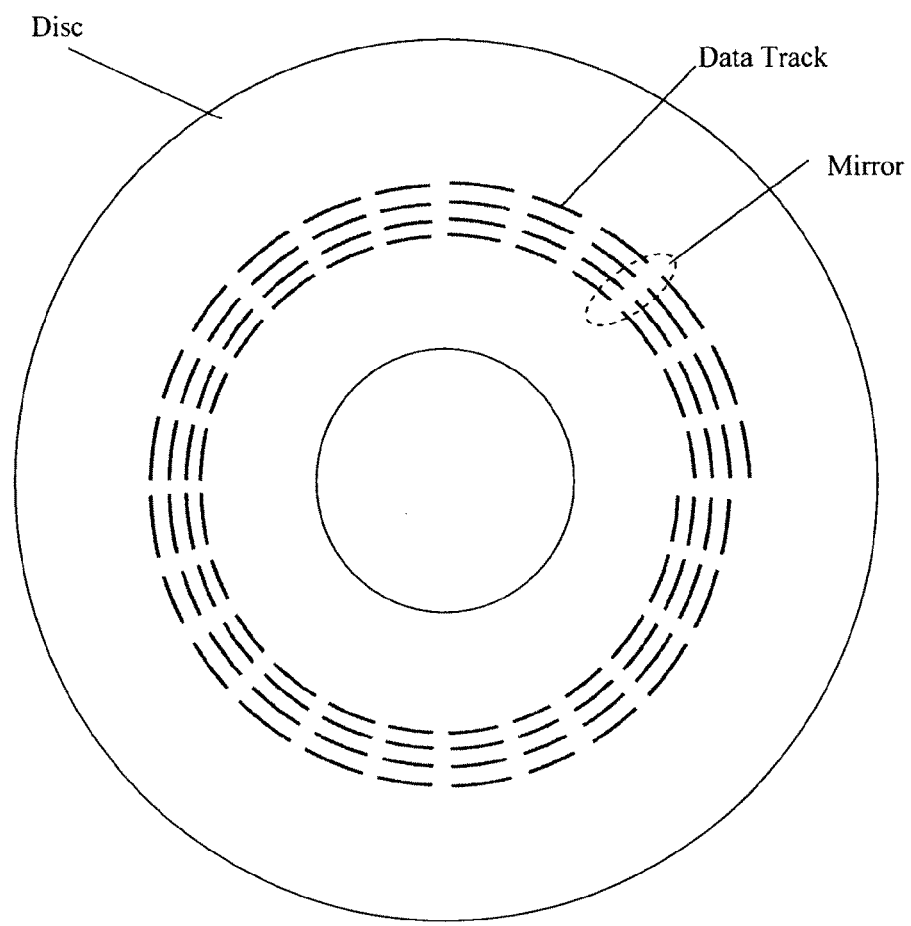
FIG. 17 is a view illustrating a configuration example of an optical disk medium that achieves an offset correction function appropriate for the present invention.

FIG. 17 is an embodiment showing a configuration of the optical disk medium that achieves an offset correction function appropriate for the present invention. This is the application of the well-known composite mirror type. In the figure, mirror portions are periodically provided on the data tracks. When an offset occurs in track control, the push-pull signal at the mirror portion does not become zero. For this reason, offset measurement is intermittently performed to apply tracking offset such that the measured value comes close to zero, whereby offset control can be achieved. Here, the distance between the respective mirror portions may be short enough to measure eccentricity and it is sufficient that the number of mirror portions per round is about 10 to 20. This period is equivalent with the length of information section in the general optical disk. Accordingly, it is preferable that the arrangement period of the mirror portions be set to about the same extent as the sector unit (2 kB in the case of DVD format and 4 kB in the case of Blu-ray Disc format). The length of the mirror portion must be twice or more times as long as the diameter of the beam spot to be used, and normally corresponds to 2 to several bytes in length according to a modulation scheme to be used. Moreover, in addition to the data address, address information can be recorded on the data track by wobbling the data track.

Figure 18:
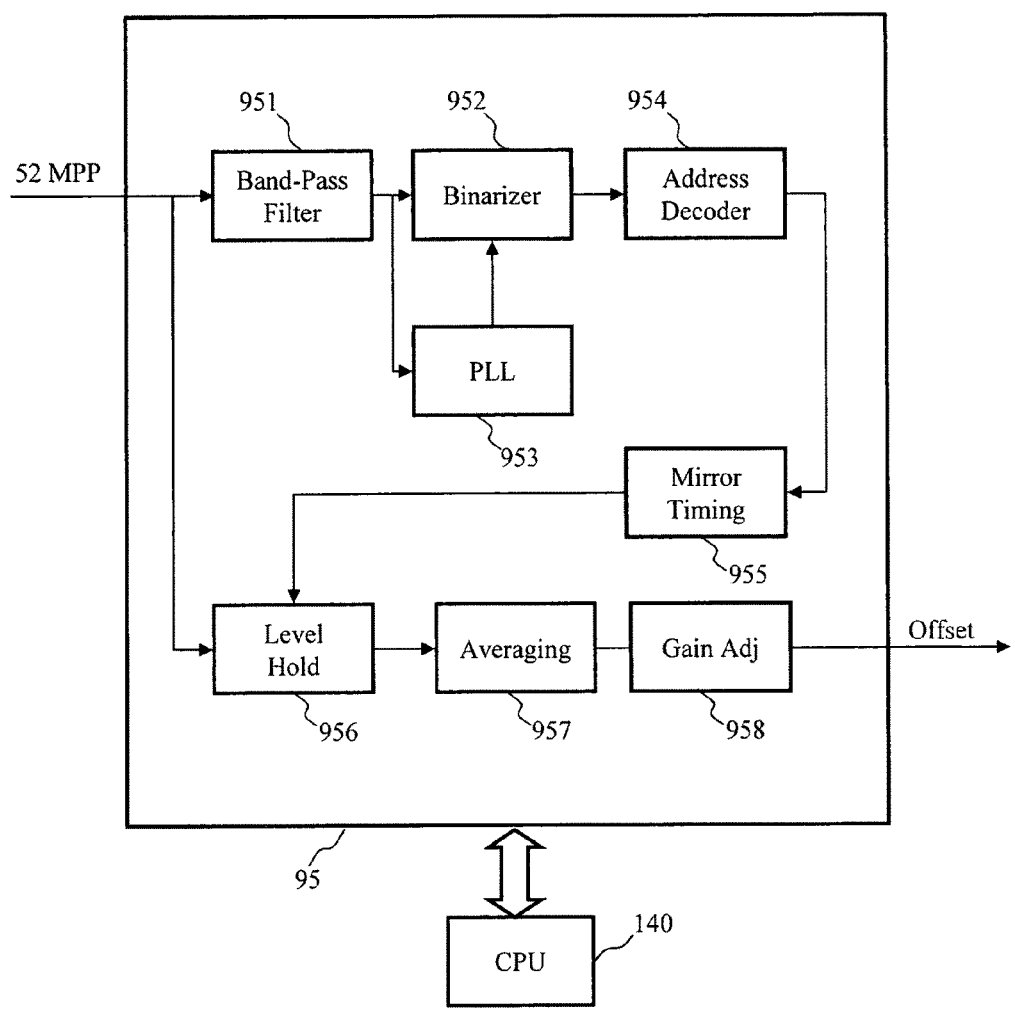
FIG. 18 is a view illustrating another configuration example of an offset control circuit appropriate for the present invention.

FIG. 18 is another embodiment showing a configuration of an offset control circuit appropriate for the present invention. This corresponds to the optical disk medium in FIG. 17. The MPP signal 52 passes through a bandpass filter 951 and then is binarized for each clock by a binarizer 952. A clock is generated from the binarized signal by a phase locked loop (PLL) circuit 953. At the same time, sector address information is read by an address decoder 954 on the basis of the binarzation result and timing of the mirror portion, which is a sector switching position, is decided by a mirror position detector 995. The MPP 52 is extracted by a level hold circuit 956 and is smoothed by an averaging processor 957 such as low-filter processing. The signal thus obtained reflects the offset of the push-pull signal caused by the movement of the objective lens actuator, and therefore a gain adjusting circuit 958 multiplies the drive current by an appropriate gain (−1 may be possible when other gain mechanisms are absent before and after the circuit) in the same way as the aforementioned example, thereby making it possible to generate an amount of corrected offsets.

Figure 11:
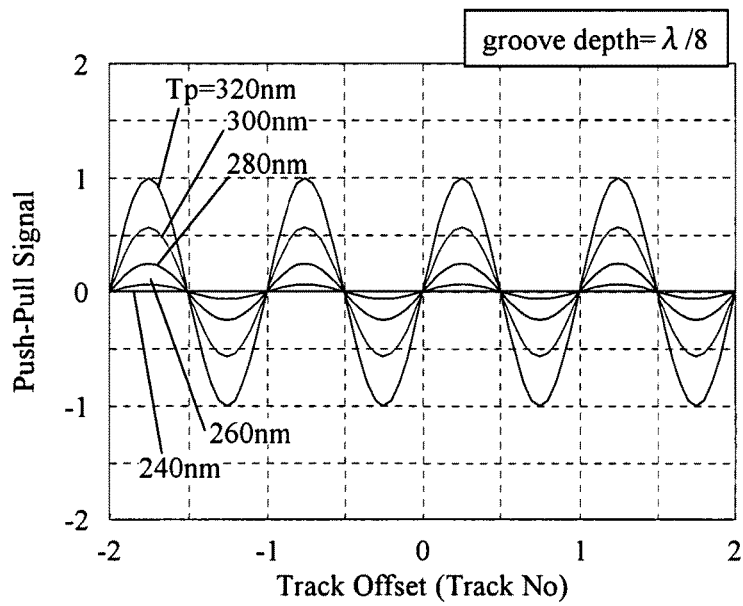
FIGS. 11A and 11B are graphs illustrating a calculation result of push-pull signals of an optical disk medium of the present invention.
Figure 11:
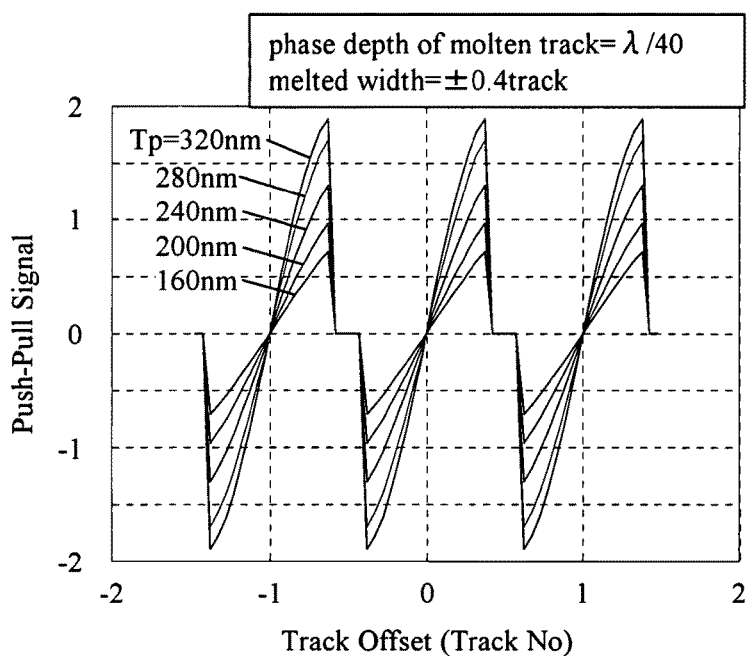
Figure 19:
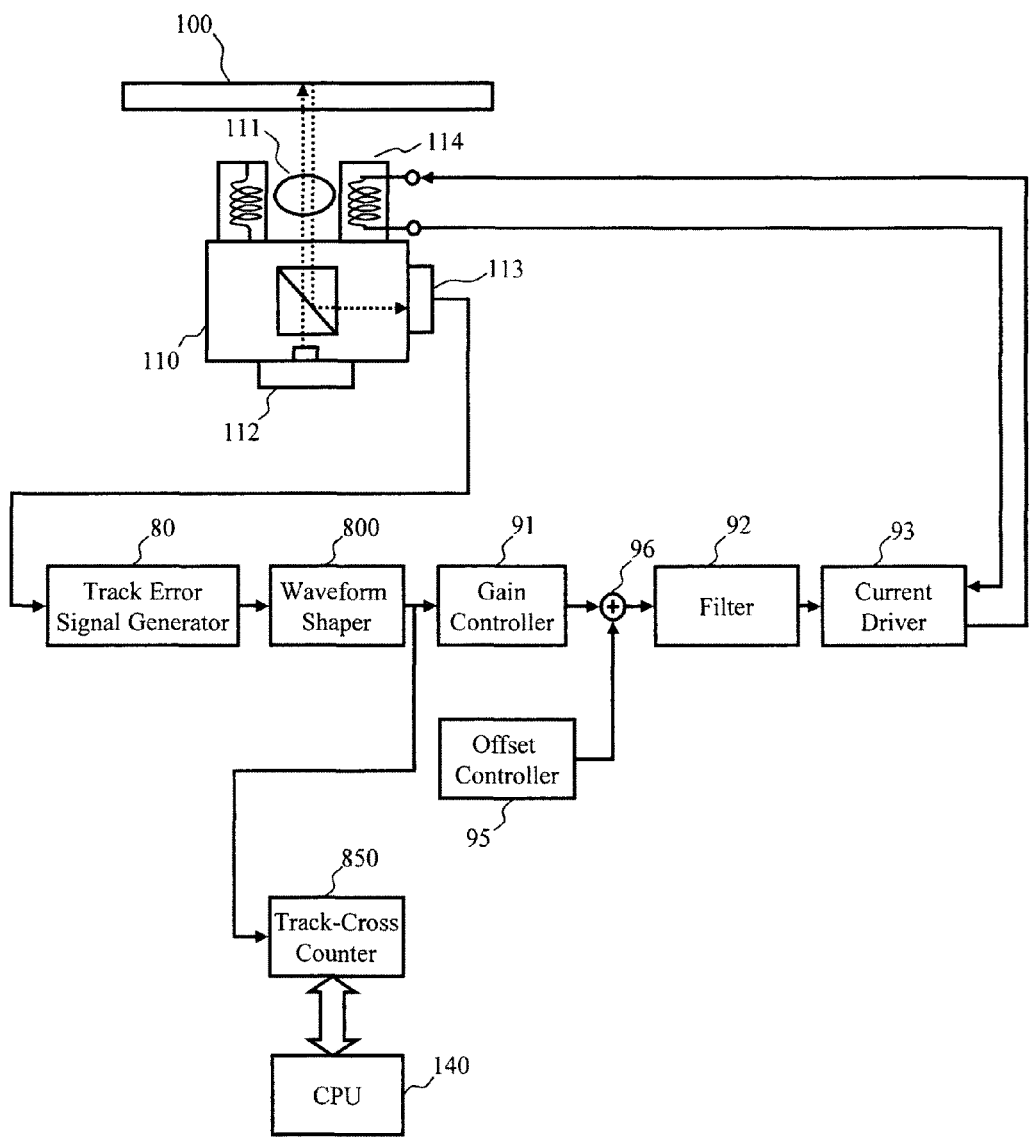
FIG. 19 is a view illustrating a configuration example of a tracking control circuit of an optical disk device of the present invention.

FIG. 19 is another block diagram showing a configuration example of a tracking control circuit of the optical disk device of the present invention. A difference from FIG. 14 lies in the provision of a waveform shaper 800 for a push-pull signal. As shown in FIG. 11, in the optical disk medium of the present invention, although a good push-pull signal can be obtained by the super-resolution effect even in a narrowed track condition, this includes a characteristic in which the signal becomes zero between the data tacks. In relation to the aforementioned signal, when various kinds of circuits provided for the conventional successive sinusoidal push-pull signals are directly used, for example, in the case of counting the number of track crossing signals at the time of seeking, at the moment when tracking control is turned on, and the like, it is expected that their operations become unstable. By using the waveform shaper 800 having a function of shaping the push-pull signals unique to the optical disk medium of the present invention into the conventional sinusoidal push-pull signals, it is possible to deal with these problems. Accordingly, a track cross counter 850, which measures the number of track crossing signals at the time of seeking, can directly use the type of device which is based on the precondition that the conventional sinusoidal wave is used. As a method for counting the number of track crossing signals, there is generally used, for example, a method in which differentiation is performed to count a zero cross point.

Figure 20:
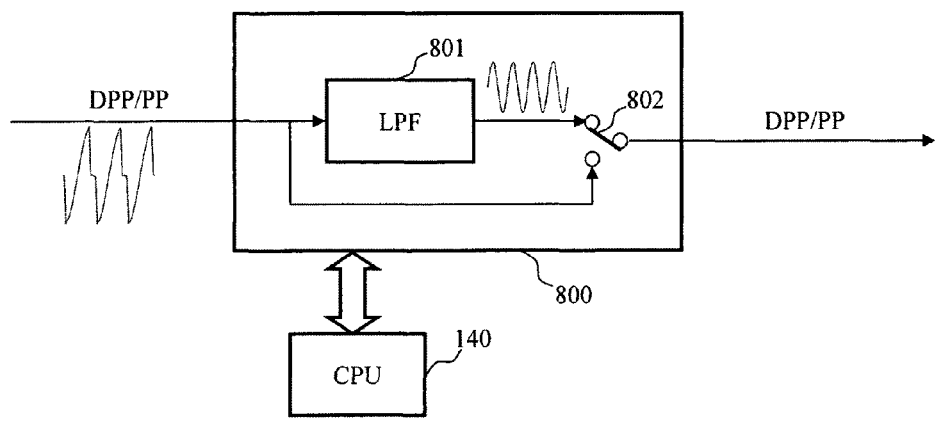
FIG. 20 is a view illustrating a configuration example of a waveform shaper of a push-pull signal of the present invention.

FIG. 20 is a block diagram showing a configuration of the waveform shaper of the push-pull signal of the present invention. The waveform shaper 800 is composed of a low-pass filter 801 and a switch 802, and the operations of these are controlled by the CPU 140. High frequency components are smoothed by the function of the low-pass filter, thereby allowing a signal to be easily shaped into a sinusoidal wave. However, since the low-pass filter causes a phase delay, there is a need to execute tracking control by a push-pull signal, which is not passed through the low-pass filter, after the tracking control is stabilized. Accordingly, in order to control the switch 802, the following may be suitable as a method. An output of the low-pass filter is first selected just when seeking starts and the tracking control is then started after seeking. Next, after waiting for a suitable time, the selection is switched such that the signal bypasses the low-pass filter 801. The waiting time may be a fixed value of about 10 ms from a tracking servo control zone. More specifically, the switch 801 may be changed over after determining that the track error signal is stabilized within a certain value (for example, a difference corresponding to about ¼ or less of the track pitch). Additionally, in the case of executing tracking control of the optical disk media such as CD, DVD, etc., which are not applied to tracking using a super-resolution phenomenon as in the optical disk medium of the present invention, it is needless to say that selection of the switch 802 must be performed to bypass the low-pass filter 801

Figure 21:
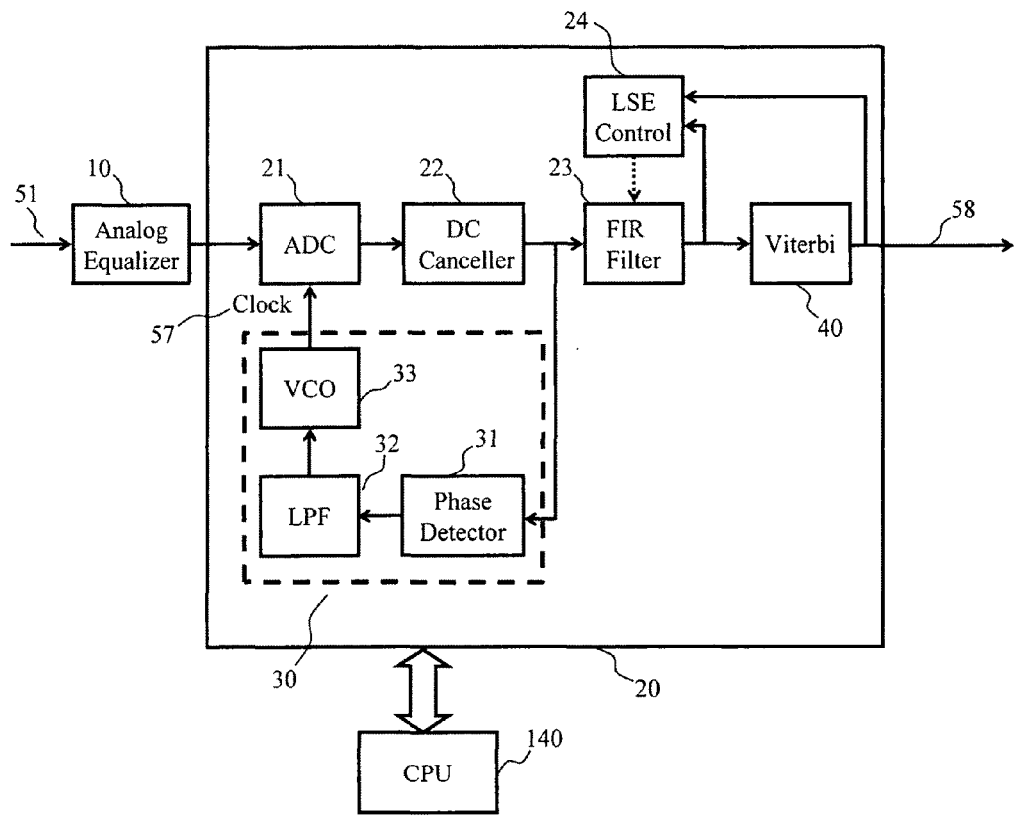
FIG. 21 is a view illustrating a configuration example of a data readout circuit appropriate for an optical disk device of the present invention.

A description will be next given of a data readout circuit of the optical disk device of the present invention. FIG. 21 is a view illustrating a configuration example of a data readout circuit appropriate for the optical disk device of the present invention. In an analog equalizer 10, the RF signal 51 detected by an optical head (not shown) is applied to equalization and AGC processing and thereafter inputted to a digital signal processing section 20. In the digital signal processing section 20, the input RF signal is converted to a digital signal by an AD converter 21 at every clock and thereafter applied to CD compensation by a DC compensator 22. Then, the resultant signal is digital equalized by an FIR filter 23 and binarized by a Viterbi decoder 40 to be taken out as a binary output 58. An internal configuration of the Viterbi decoder 40 is not specifically described here because it exceeds the scope of the present invention, but the internal configuration is intended to compare a readout signal with a target signal generated by a convolution of a binary bit string and PR class, and to sequentially select each binary bit string at which an error therebetween reaches a minimum. Learning process of tap coefficients of the FIR filter 23 is carried out by an LSE control section 24. A phase locked loop (PLL) circuit 30 that generates a clock signal is composed of a phase detector 31, a low-pass filter 32, and a voltage controlled oscillator (VCO) 33. By the aforementioned configuration, it is possible to obtain the binary data 58 from the RF signal 51. The binary data 58 is inputted to a logic format decoder, which is not shown in the figure, thereby making it possible to read data which is applied to demodulation processing and which is recorded on the optical disk medium.

A description will be next given of a learning function of read power in the optical disk device of the present invention. In the optical disk medium of the present invention, a temperature distribution of a beam spot is used to change an optical characteristic of super-resolution material only around the center of the beam spot to thereby achieve narrow tracking that exceeds the diffraction limit. In order to continue such an effect, there is a need to maintain a power value of an irradiating laser beam appropriately.

Figure 22:
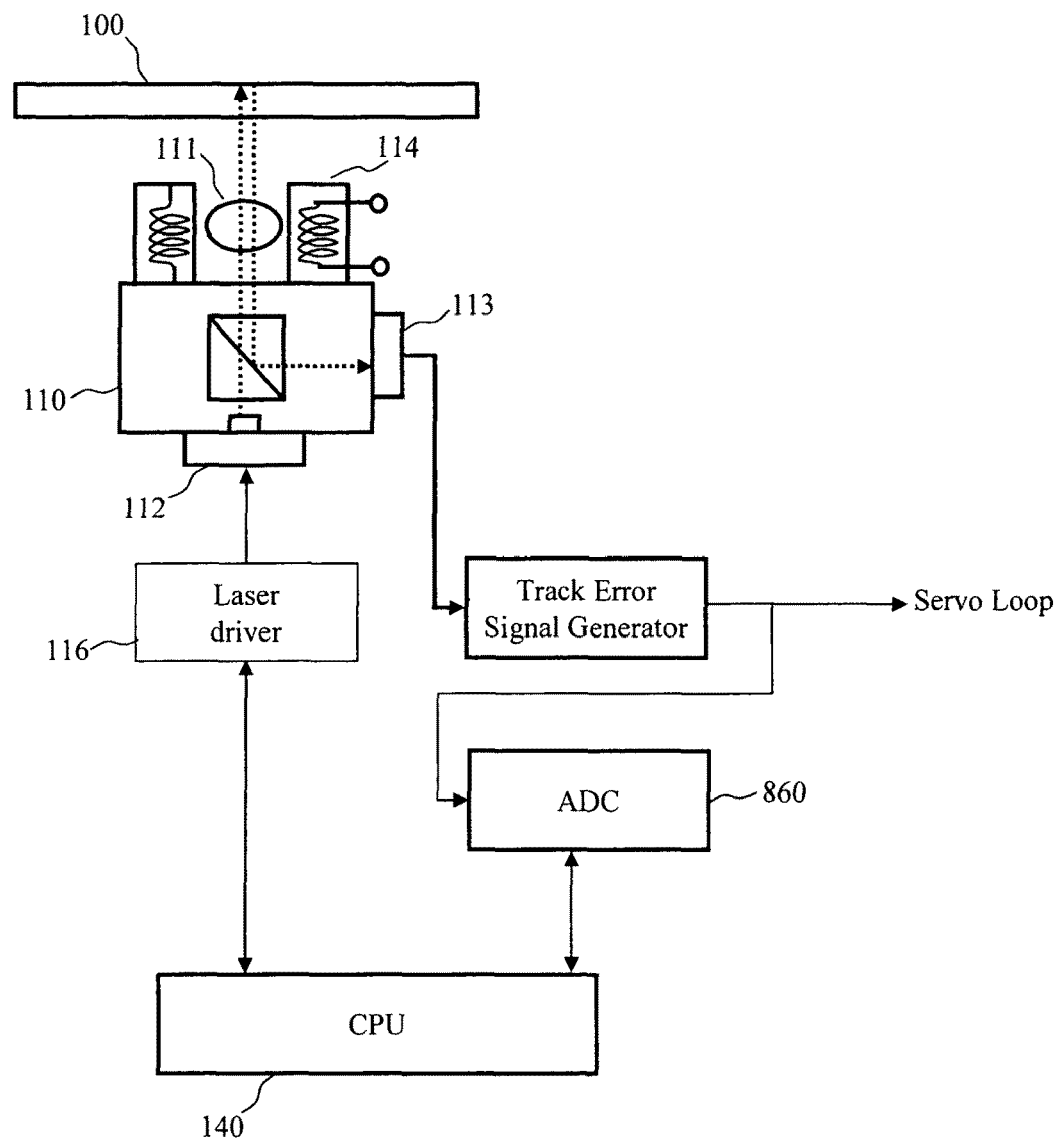
FIG. 22 is a block diagram illustrating a learning function of read power appropriate for an optical disk device of the present invention.
Figure 23:
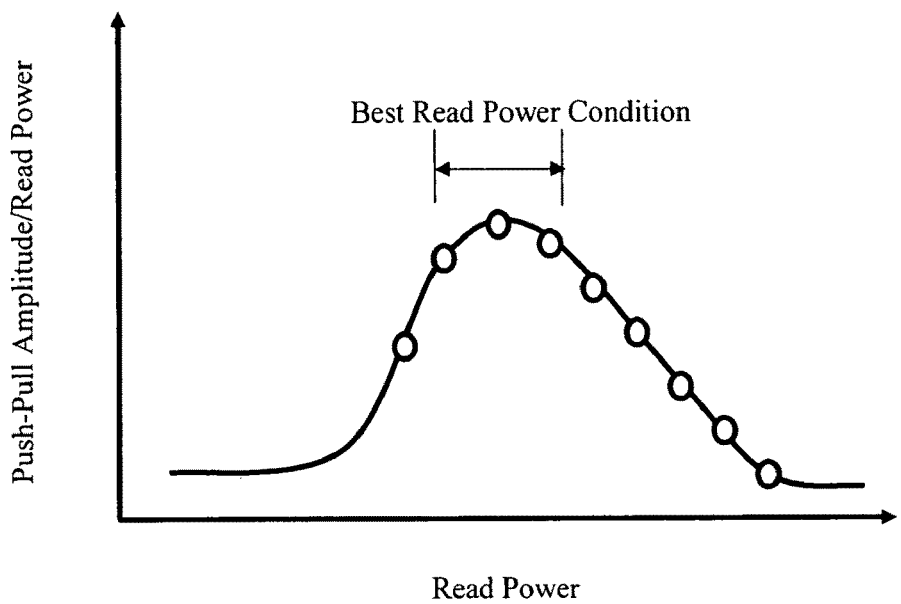
FIGS. 23A and 23B are schematic views illustrating a relationship between read power and a track error signal.
Figure 23:
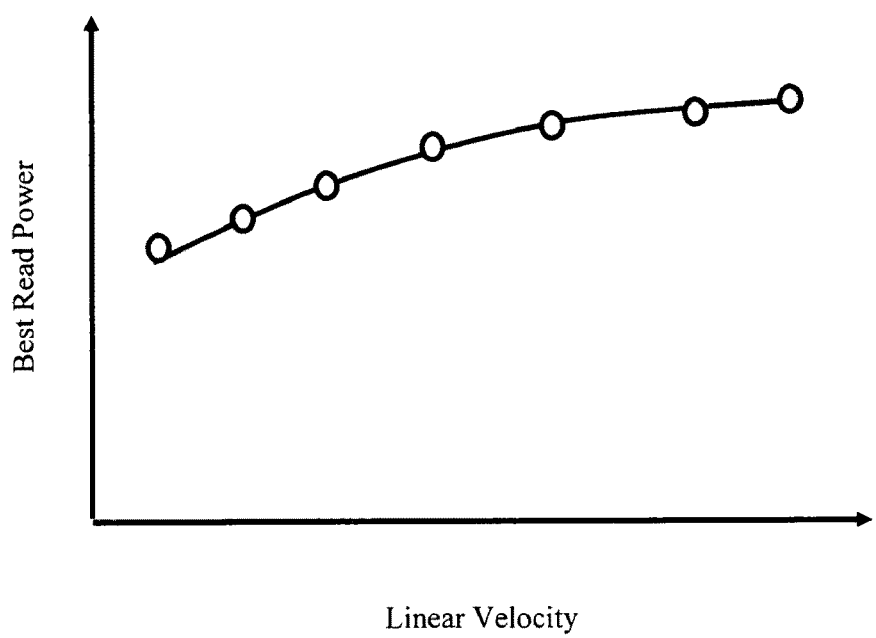

FIG. 22 is a block diagram showing a learning function of read power appropriate for the optical disk device of the present invention. In the figure, laser power (read power) with which an optical disk device 100 is irradiated is controlled by an amount of currents flowing to a semiconductor laser 112. The current is driven by a laser driver 116 according to an instruction from the CPU 140. On the other hand, an output of a track error signal generation circuit is digitalized by an AD converter 860 and is fetched in the CPU 140. In connection with the aforementioned configuration, a relationship between read power and a track error signal is schematically shown in FIG. 23A. As shown in the figure, a relationship between the read power and a normalized track error signal obtained by dividing the track error signal by read power is that amplitude of the normalized track error signal reaches maximum in a condition that melting is possible by a width of substantially one data track at a spot of the irradiated light beam. In the process of learning, with only autofocus being executed, processing may be carried out where amplitude of the normalized track error signal is measured as changing read power and the read power is appropriately fixed so that such amplitude reaches substantially maximum. Moreover, in the case of executing high-velocity rotation readout so that linear velocity changes depending on a radial position of the optical disk medium such as a constant angular velocity (CAV) control and the like, a relationship between the linear velocity and an optimum read power is obtained in advance and optimum read power may be used according to the linear velocity. Furthermore, there is a case in which the optimum read power is changed by an influence of such as a change in drive environmental temperature, in-plane variations in melting sensitivity of super-resolution material formed on the optical disk medium. In order to deal with this, the aforementioned learning processing is carried out to always maintain read power in an appropriate condition and this is an effective method to stabilize the performance of the optical disk device.

Figure 24:
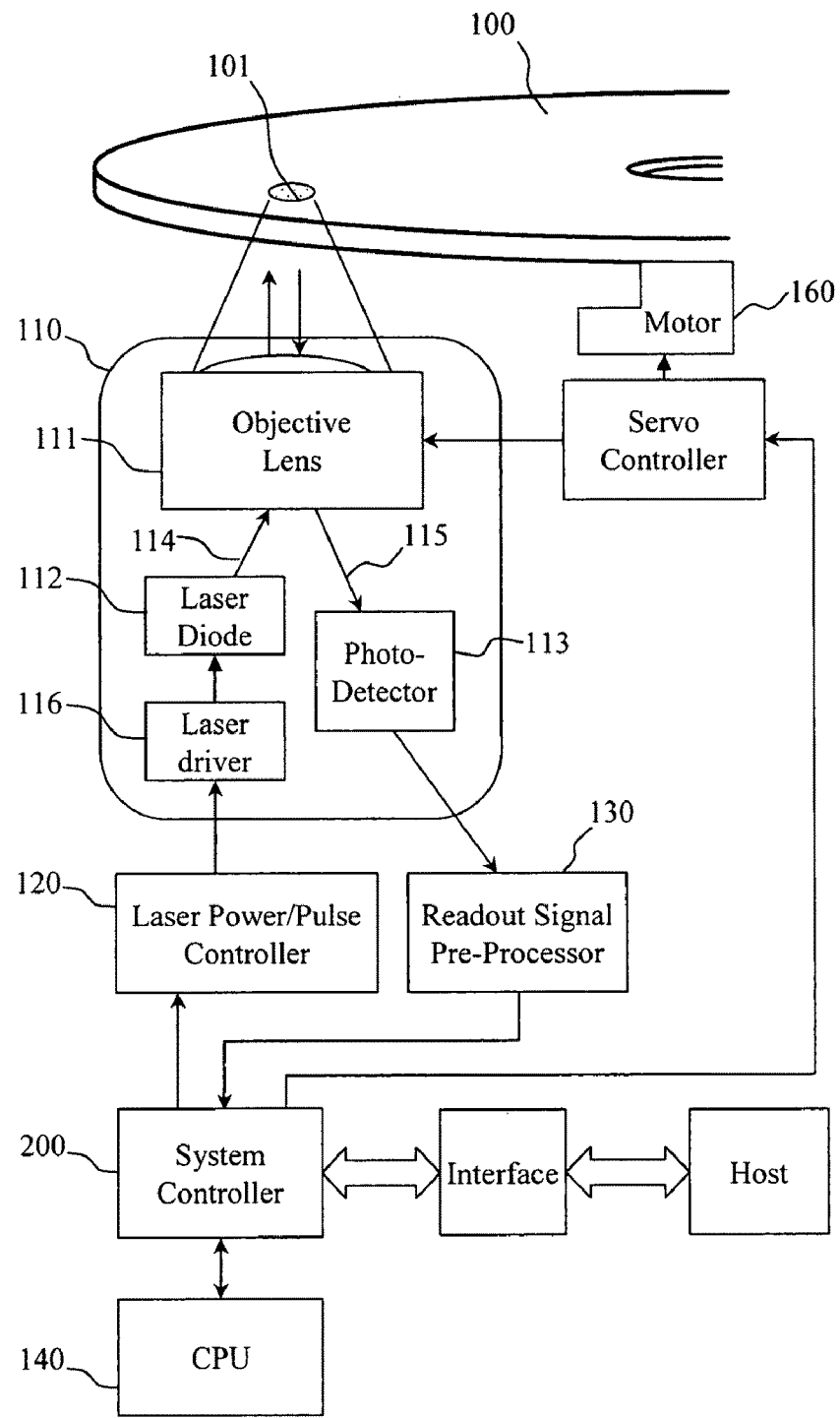
FIG. 24 is a schematic view of a configuration example of an optical disk device.

Finally, the entire configuration of the optical disk device of the present invention will be described. FIG. 24 is a schematic view illustrating a configuration example of an optical disk device of the present invention. The optical disk medium 100 mounted on the device is rotated by a spindle motor 160. At a readout time, a laser power/pulse controller 120 controls current to be supplied to the semiconductor laser 112 via the laser driver 116 in an optical head 110 to generate a laser beam 114 in such a way to obtain light intensity instructed by the CPU 140. The laser beam 114 is condensed with an objective lens 111 to form a beam spot 101 on the optical disk medium 100. A reflected light 115 from the beam spot 101 is detected through the objective lens 111 by a photodetector 113. The photodetector is composed of multiple divided photodetection elements. A readout signal processing circuit 130 reads information recorded on the optical medium 100 using a readout signal detected by the optical head 110. The track error signal generation circuit, tracking control circuit, and data readout circuit of the present invention are incorporated into a system control circuit 200. The foregoing configuration enables the optical disk device of the present invention to achieve data readout from the optical disk medium of the present invention, wobble address readout, and tracking control. The aforementioned configuration makes it possible to provide the optical disk device of the present invention.

The present invention can be used in the large-capacity optical disk medium using a super-resolution effect and its corresponding optical disk device.

What is claimed is:

1. An optical disk medium comprising:
   a plurality of information tracks on which data is formed as a mark and a space in an area of the optical disk medium without grooves at both sides of the information tracks; and
   a thin film material, which is formed in the mark, and which has an optical constant varying between in a high temperature state and in a low temperature state,
   wherein in the low temperature state, an optical phase of the mark is substantially equal to an optical phase of the space,
   wherein in the high temperature state, at least the optical phase of the mark is set to be different from the optical phase of the space, and
   wherein the mark is responsive to irradiation of a condensed optical beam so as to be heated to the high temperature state in which at least the optical phase of the mark is different from the optical phase of the space so as to enable detection of a push-pull signal from the different optical phases of the mark and the space of the information tracks independent of grooves of the optical disk medium.

2. The optical disk medium according to claim 1, wherein a mirror portion is periodically formed on the information track.

3. A tracking method for an optical disk medium including:
   a plurality of information tracks on which data is formed as a mark and a space in an area of the optical disk medium without grooves at both sides of the information tracks; and a thin film material, which is formed in the mark, and which has an optical constant varying between in a high temperature state and in a low temperature state, and in the optical disk medium, in the low temperature state, at least an optical phase of the mark being substantially equal to an optical phase of the space, and in the high temperature state, at least the optical phase of the mark being set to be different from the optical phase of the space,
   the method comprising the steps of:
   forming a light spot focused on the optical disk medium by condensing an optical beam emitted from a laser light source so as to heat the mark to the high temperature state in which at least the optical phase of the mark is different from the optical phase of the space;
   detecting a push-pull signal from the different optical phases of the mark and space of the information tracks independent of grooves of the optical disk medium;
   measuring an amplitude of the push-pull signal obtained by a photodetector as changing outgoing power of the laser light source;
   obtaining an amplitude of a normalized push-pull signal by dividing the amplitude of the push-pull signal by the outgoing power of the laser light source;
   determining the outgoing power of the laser light source such that the amplitude of the normalized push-pull signal reaches substantially a maximum; and
   executing tracking control using the push-pull signal.

4. The tracking method according to claim 3, further comprising the steps of:
   detecting a drive current being made to flow to an object lens actuator for tracking control on the basis of the push-pull signal; and
   correcting an offset of the push-pull signal by obtaining a signal corresponding to the offset of the push-pull signal from the drive current, and by applying the offset to the push-pull signal.

5. The tracking method according to claim 3, further comprising the steps of:
   forming a mirror portion on the information track of the optical disk periodically;
   measuring the push-pull signal at the mirror portion; and
   applying the offset to the push-pull signal such that the push-pull signal measured at the mirror portion comes close to zero.

6. The optical disk medium according to claim 1, wherein the push-pull signal is utilizable for tracking control.

* * * * *